United States Patent [19]

Engelke et al.

[11] Patent Number: 5,325,417

[45] Date of Patent: Jun. 28, 1994

[54] TELECOMMUNICATION DEVICE FOR THE DEAF WITH AUTOMATIC SELF-IDENTIFICATION

[75] Inventors: Robert M. Engelke, Madison; Kevin Colwell, Middleton; Ronald W. Schultz, Madison, all of Wis.

[73] Assignee: Ultratec, Inc., Madison, Wis.

[21] Appl. No.: 886,553

[22] Filed: May 20, 1992

[51] Int. Cl.⁵ .............................. H04M 11/00
[52] U.S. Cl. ...................... 379/52; 379/98; 375/121
[58] Field of Search ................. 379/52–54, 379/90, 93, 96–99, 110, 108; 340/825.19; 370/31, 24, 110.1; 375/8, 9, 91, 107, 114, 116, 121

[56] References Cited

U.S. PATENT DOCUMENTS

| | | | |
|---|---|---|---|
| 3,507,997 | 4/1970 | Weitbrecht | 379/108 |
| 4,451,701 | 5/1984 | Bendig | 379/96 |
| 4,959,847 | 9/1990 | Engelke et al. | 379/98 |
| 5,081,673 | 1/1992 | Engelke et al. | 379/52 |
| 5,091,906 | 2/1992 | Reed et al. | 370/31 |
| 5,121,421 | 6/1992 | Alheim | 379/52 |
| 5,163,081 | 11/1992 | Wycherley et al. | 379/52 |

FOREIGN PATENT DOCUMENTS 60-259058  12/1985  Japan ........................ 379/96

*Primary Examiner*—Wing F. Chan
*Attorney, Agent, or Firm*—Quarles & Brady

[57] ABSTRACT

A telecommunication device for the deaf includes a self-identification sequence which automatically commences upon the initiation of communication with the device. The self-identification sequence consists of a series of characters which may be separated by pauses and the device listens during the pauses to see if TDD communication has been established. The purpose of the character string is so that a receiving station can identify, with a low rate of error, a calling TDD and therefore switch the incoming call to a TDD equipped operator. This capability is particularly useful for emergency service operators (911 services) which must be able to handle incoming TDD calls with a maximum of efficiency and a minimum of error.

14 Claims, 2 Drawing Sheets

TELECOMMUNICATION DEVICE FOR THE DEAF WITH AUTOMATIC SELF-IDENTIFICATION

FIELD OF THE INVENTION

The present invention relates to a telecommunication device for the deaf which is capable of automatically identifying itself to the party on the other end of the line.

BACKGROUND OF THE INVENTION

Persons who are deaf or hearing-impaired who cannot hear well enough to use the telephone commonly make use of communication terminals specifically constructed and designed to enable such persons to converse over the telephone lines. Such devices are referred to as telecommunication devices for the deaf or TDD and include both a keyboard and a display connected to the telephone through a modem (modulator/demodulator). The modem is typically built into the TDD and either directly wired to a telephone line or coupled through an acoustic coupler to a normal telephone handset. The TDD is capable of transmitting information over a telephone line by means of coded tones to another similar TDD connected at the opposite end of the telephone line through another modem.

There are several protocols by which electronic devices are capable of communicating through analog lines, such as telephone lines. The most common used in the industry is referred to as ASCII (American Standard Code for Information Interchange), and is commonly used for information interchange between computers. However, historically, TDD have operated on a different protocol, referred to as Baudot. There is both a Baudot code and a protocol of communication referred to as Baudot/Weitbrecht.

The Baudot/Weitbrecht communication protocol has several idiosyncrasies which result from the early equipment used to implement it. Baudot devices communicate at 45.5 Baud and utilize a 5 bit code utilized only by Baudot machines. In the Baudot code transfer protocol, the presence of a logical 1 is indicated by an 1400 Hertz tone while the presence of a logical 0 is indicated by an 1800 Hertz tone. Under Baudot code, where no character or bit is being transmitted, there is no tone transmitted on the line. Baudot machines operated in simplex, that is to say if two Baudot machines are communicating, only one is capable of transmitting at a time. The normal convention of Baudot communication is that the receiving station communicate in Baudot first to the calling station. The ability to communication to the outside world through a TDD can be an essential, sometimes even vital, service to a deaf person. For example, in times of emergency, a deaf person must be able to use his or her TDD to make an emergency call of a kind that a hearing person makes orally. It is for that reason that many emergency service operators (including 911 services) in the United States are required to be equipped with TDD, and incoming call detectors to sense TDD on the line, so as to handle in-coming calls from deaf or hearing impaired persons in emergency situations. In such situations, however, the existing Baudot protocol presents a deficiency in the operation of a TDD device in such a emergency situation. The deficiency arises because the calling TDD normally waits for a response from the answering TDD prior to transmitting characters. If the TDD user is calling a 911 emergency service center, the person answering the telephone may hear only silence on the telephone line. Several emergency service operating systems have implemented circuits, therefore, intended to monitor the incoming lines and detect the characteristic TDD signals (1400 and 1800 Hertz) on the incoming line, and, when such signals are received, to alert the operator that the call is coming from a TDD or to switch that incoming line from a hearing person to a TDD. Thus, many emergency service operator systems are presently equipped with devices, referred to as TDD detectors, which are capable of sensing TDD generated codes and alerting the operator that a call is from a TDD, so that the incoming signal can be connected to the services own TDD.

It has been a problem with such TDD detectors and incoming signals from TDD in that the TDD detectors are capable of being falsely tripped. The 1800 and 1400 Hertz of Baudot tones are sounds which are common in the human environment, making it possible for background sounds to be interpreted as a Baudot character. Also, some TDD detectors may require several characters to be received by the calling TDD, which may leave the calling deaf person in some confusion as to what information has been received by the emergency services operator. Both difficulties would be ameliorated if a protocol existed by which TDD could identify specifically themselves, and the capabilities of their TDD, in a manner that was sufficiently distinctive so as to render extremely unlikely either falsely triggering or not triggering at all the TDD detector present at the emergency services facility.

SUMMARY OF THE INVENTION

In accordance with the present invention, a telecommunications device for the deaf has a pre-selected pattern of pauses and characters which are characteristic of the telecommunication device. A detector in an emergency services operator can test specifically for the presence of this characteristic signal to determine whether a telecommunication device for the deaf is calling the emergency service. The TDD capable of emitting this signal is capable of doing so in a fashion that is not disruptive to communicating with existing TDD in the field, is capable of actuating all present auto-activation equipment and is non-disruptive to existing emergency service networks.

It is an object of the present invention to provide a telecommunication device for the deaf which is more certainly capable of properly being handled by an emergency service operator.

It is another object of the present invention to provide a telecommunication device for the deaf that identifies itself in a characteristic manner, even when it is the calling station, so that receiving equipment can properly mechanically and automatically handle such a call from such a device.

It is another object of the present invention to provide a communication protocol for TDD communication that permits a calling TDD to identify itself while still being compatible with all existing TDDs in use.

It is also an object of the present invention to operate so as to automatically identify a calling TDD to a receiving station without the need for user action.

Further objects, advantages, and features of the present invention will become apparent from the following specification when taken in conjunction with the accompanying drawings.

DESCRIPTION OF THE INVENTION

In accordance with the present invention a telecommunication device for the deaf has built into it a function so that it is automatically self-identifying. this self-identification procedure and capability is particularly useful for communication with emergency services, but is also generally useful and functional in everyday communication. The manner of self-identification by the TDD of the present invention is particularly intended to be both distinctive and unlikely to lead to erroneous signals. In order to understand best how this functionality will be implemented, it is first necessary to understand the fundamentals of a typical TDD.

Figure 1:
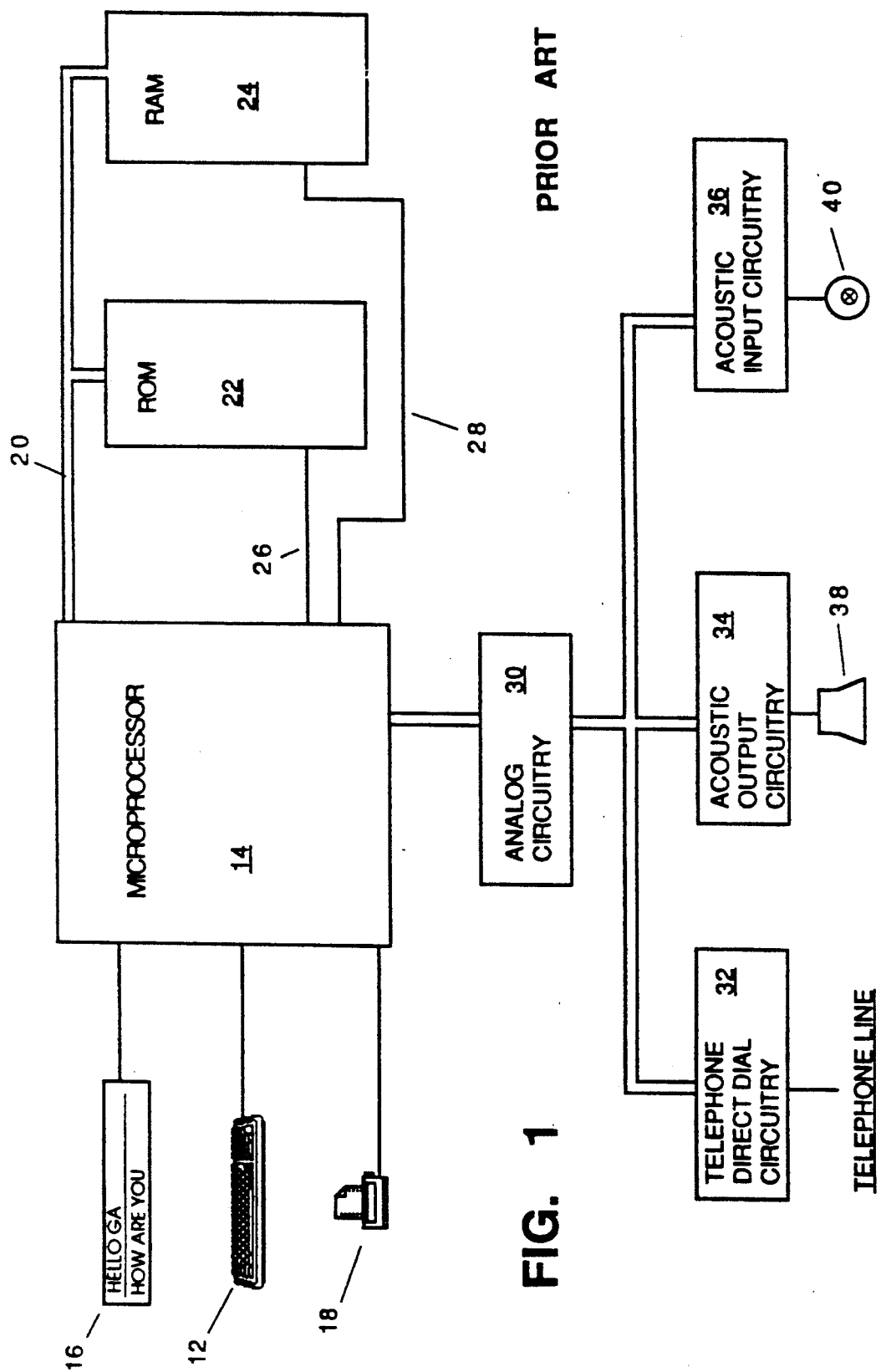
FIG. 1 is a schematic diagram of a TDD hardware.

Shown in FIG. 1 is a schematic block diagram of the function of a typical TDD. In the TDD of FIG. 1, the user types on a keyboard indicated at 12 to input characters into a microprocessor indicated at 14. Characters which are received or transmitted by the microprocesor are also displayed to the user on a visual electronic display, indicated at 16. Characters may also optionally be displayed by means of a hard copy printer, indicated at 18, which some TDD include. The microprocessor 14 is largely responsible for the implementation of the various timing and decoding functions of the TDD. The microprocessor has data and address buses, jointly indicated at 20, which connect to a read-only memory (ROM) 22 and a random access memory (RAM) 24. Appropriate control lines 26 and 28 connect to the ROM 22 and RAM 24 so as to control the operation thereof. The ROM is intended to contain the program which dictates the functional operation of the microprocessor 14. The RAM is utilized as a holding place or stack for data coming into or out of the TDD. In some TDD, the microprocessor, the RAM and the ROM are all combined in a single integrated circuit, while in others they are separate circuits.

As an additional output, the microprocessor connects through analog circuitry 30 to one of three separate outputs. The analog circuitry 30 is, most preferably a modem. One output of the analog circuitry 30 could be a telephone direct connect circuitry 32 which connects the modem directly by hardwiring into the telephone network. A second possible output from the analog circuitry is through an acoustic output 34 intended to audibly connect to the microphone of a telephone handset. At 36 is indicated acoustic input circuitry connected to a microphone, which is intended to audibly couple to the speaker in a telephone handset. The acoustic output speaker and the acoustic input microphone may be connected through a so-called "acoustic coupler" to a conventional telephone handset. In any TDD, either the hardwired connection or the acoustic connection is provided, and sometimes both.

Figure 2:
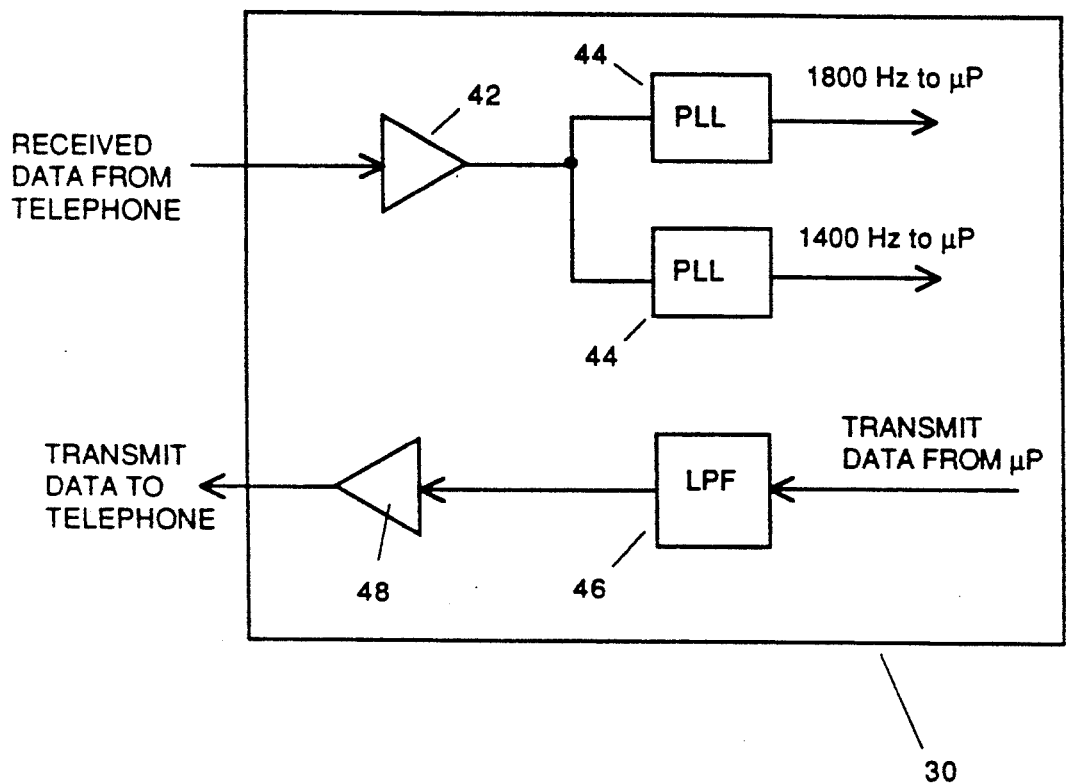
FIG. 2 illustrates schematic details of the analog circuit of FIG. 1.

Shown in FIG. 2 is a simplified schematic of how one implementation of the input and outputs of the analog circuitry would work. For data coming into the terminal, the audible input from a microphone or telephone is translated into electronic components and then presented to an amplifier 42. The output of the amplifier is presented to two phase locked-loops 44. One of the phase locked-loops 44 is tuned to a frequency of 1800 Hertz, while the other phase locked-loop 44 is tuned to a frequency of 1400 Hertz. 1800 Hertz and 1400 Hertz are the designated carrier frequencies for standard Baudot communication. On the output side of the circuitry, output signals are presented to a LPF (low pass filter) transmit wave shaping circuit 46. The output of that circuitry, consisting of alternate 1400 and 1800 Hertz signals, is presented to an amplifier 48 which is hardwired to the speaker or telephone line.

In its operation, the TDD of the present invention will, unlike conventional TDD, initiate communication transmission on its own. The sequence would work as follows: The TDD makes a call to a remote facility. Once the communication link is established, first there is a pause or delay which is specifically intended to be enough time so that the user can see call progress on the signal light on his own TDD. The time necessary is somewhat variable, but a delay of seven seconds has been found to be suitable. The TDD is receptive, during this first delay period, to received data transmissions and, if data is received, the auto-identifying signal may not be sent. After this delay, the TDD transmits a message of two or more characteristic and specially timed characters. The message is also transmitted in a unique fashion. After each character is transmitted, the machine pauses for another delay time period. The delay time can be variable, anywhere from one to two bit times to one to two character times, a time period of approximately 176–352 milliseconds. Thus the machine sends a first character, pauses, sends a second character, pauses, and sends a third character. The total lapsed time of that sequence is preferably the equivalent of 5 character times or less under standard Baudot protocols. During the pauses between transmission of the individual characters, the TDD examines the incoming telephone signal line to ascertain whether a response, in the form of data reception from a remote terminal, has been received. The pauses are necessary in order to sense incoming data characters from the remote terminal, since TDD communication is simplex permitting only one station at a time to transmit if data is to be understood. If a response is received during one of the delays, the TDD ceases transmitting the self-identification code and commences normal communication between the two users. A time period for the pause of anywhere from one or two bit times to a character time (5–350 milliseconds) are sufficient to test for such a responsive transmission. The pauses must be less than three seconds for the signal to trip the TDD detectors.

It is advantageous that the self-identifying code be more than one character. Single character codes are too prone to false tripping of detection equipment. Consequently many existing TDD detectors may require more than one character to trip. Since the TDD tones (1400 and 1800 Hertz) are well within the range of normal audible sounds in the environment, it is advantageous that the detecting devices located at emergency service facilities, or other facilities which interact with TDD equipped users, have features designed so as to minimize the connection time of TDD calls to hearing operators. Thus it is intended and desired that the TDD self-identification code be very distinctive and not one likely to be replicated in the background environment of any hearing person's call.

It has been found herein that three characters transmitted in the pattern described above satisfy the criterion. In particular, it has been found desirable that the three characters specifically identify the text device. This can be done most conveniently by typing the class of the device. In North America, what would be typed, in the most preferred version, is then "TDD," or "TT ." In other words, the first character would be a "T" and the second and third characters during the self-identification sequence would be a "D." In this way, once switching has been made at the receiving station to the appropriate TDD-equipped operator, what would happen is that the operator would see on his or her TDD a confirmation that a TDD is seeking to communicate. The character sequence can be varied to other indications, such as "TT_" (T,T, space character) for "text-telephone" or other codes or acronyms.

It has also been found that the three character, format described here, i.e. character 1, pause, character 2, pause, character 3, long pause, repeat, is particularly effective and efficient. It has been found that devices which detect TDDs (TDD detectors) vary in what threshold is determined to represent TDD communications. Some TDD detectors require two characters within four seconds, while others require three characters within seven seconds. The TDD self-identification protocol described here triggers all known TDD detectors and provides a visual self-identification to a receiving TDD if on-line.

When normal communication is established between the calling TDD and the called TDD, the self-identification signal is ceased. A timing circuit continually and periodically tests whether either transmitting or receiving transmissions are occurring. If the TDD is neither sending nor receiving data for more than a pre-determined period of time, the TDD again commences the auto-identification sequence. A suitable period of time for the TDD to wait prior to initiating self-identification again is imposed. This time period is typically more than six seconds. The function of this resume TDD self-identification sequence is to remind the other terminal that the TDD is present on the line and awaiting communications. This periodically repeated signal is also useful to identify a TDD call if telephone lines are switched or put on hold. Since the TDD is periodically identifying itself, a hearing person picking up the telephone line connected to the TDD would hear a characteristic tone sequence and know that TDD communication is appropriate.

Thus the TDD of the present invention is intended to identify itself automatically, without user input or action. Since the automatic self-identification happens inherently at the commencement of each communication session, once these devices are widespread, receiving devices can begin to test for and detect the automatic identification signal to identify automatically the identity and/or type of the calling station and display the information for the user. This automatic identification also facilitates calls to telephone lines handled by hearing users (e.g. "911" centers) who will promptly be notified that a TDD is on the line due to the tones received.

It is to be anticipated the present invention is subject to much modification and variation but it is understood that the present invention embraces all such forms thereof as come within the scope of the following claims.

We claim:

1. A telecommunication device for the deaf comprising
   a keyboard;
   a visually readable display;
   a microprocessor operating in accordance with a program code and connected to accept input data characters from the keyboard and to present data characters on the display;
   an analog input circuit adapted to being connected to a telephone line so as to be responsive to the reception of Baudot tones over the telephone line and also connected to the microprocessor so as to provide a digital input to the microprocessor of the data received over the telephone line;
   an analog output line adapted to being connected to the telephone line so as to be capable of presenting Baudot tones over the telephone line and also connected to receive data from the microprocessor and transmit Baudot tones encoding such data over the telephone line; and
   a memory device connected to the microprocessor containing the program code for operation of the microprocessor to control operation of the telecommunications device to generally (i) receive data entered from the keyboard, (ii) present entered data from the keyboard on the analog output line, (iii) receive input data from the analog input line; and (iv) display data from both the keyboard and the input analog line on the display; the program code causing the device to automatically transmit onto the telephone line an identification signal including at least two characters, the two characters being transmitted in less than three seconds, the two characters being separated by pauses with the transmission of the identification signal being suspended if a Baudot tone is received during a one of the pauses.

2. A telecommunications device for the deaf as claimed in claim 1 wherein the signal includes three characters, with delays interposed between them, the signal transmitting all three characters in less than four seconds.

3. A telecommunication device for the deaf as claimed in claim 1 wherein the transmitted characters identify the calling device to a receiving device.

4. A telecommunication device for the deaf as claimed in claim 1 wherein characters transmitted are the characters "TDD."

5. A telecommunications device for the deaf as claimed in claim 1 wherein the characters transmitted are the characters "TT ."

6. A telecommunication device for the deaf as claimed in claim 1 wherein the device is programmed to repeatedly transmit the identification signal until a response is received.

7. A telecommunication device for the deaf as claimed in claim 1 wherein device is programmed to additionally transmit the identification signal whenever no data is received or transmitted for a preselected time interval.

8. A telecommunication device for the deaf as claimed in claim 7 wherein the time interval is more than six seconds.

9. A method of operating a telecommunication device for the deaf including a keyboard, a display, a microprocessor connected to receive data from the keyboard and present data to the display, input and output analog circuits to connect the microprocessor to a telephone line, and a memory circuit comprising the steps of
   (a) initiating a communication session with a remote device;

(b) prior to receiving communication from the remote device transmitting onto the telephone line Baudot tones encoding an identification signal including at least two characters while pausing between the characters to test for transmissions by a remote device, the pause being for less than three seconds; and (c) if and when a Baudot tone is received from the remote device, causing transmission of the identification signal and initiating normal communications.

10. A method as claimed in claim 9 further comprising the step of during the communication session if and when there is no transmission and no reception of data for a preselected time interval, recommencing periodic transmission of the identification signal.

11. A method as claimed in claim 9 wherein in step (b), there is a pause between each of the characters of the identification signal sufficiently long so that the device can detect reception of a data transmission to it.

12. A method as claimed in claim 9 wherein in step (b), the characters transmitted identify the calling device to the remote device.

13. A method as claimed in claim 9 wherein in step (b), characters transmitted are "TDD."

14. A method as claimed in claim 9 wherein in step (b), the characters transmitted are "TT ."

* * * * *